Jan. 11, 1944.  B. A. RAETSCH  2,338,821
THREADING APPARATUS
Filed Oct. 19, 1940   2 Sheets-Sheet 1
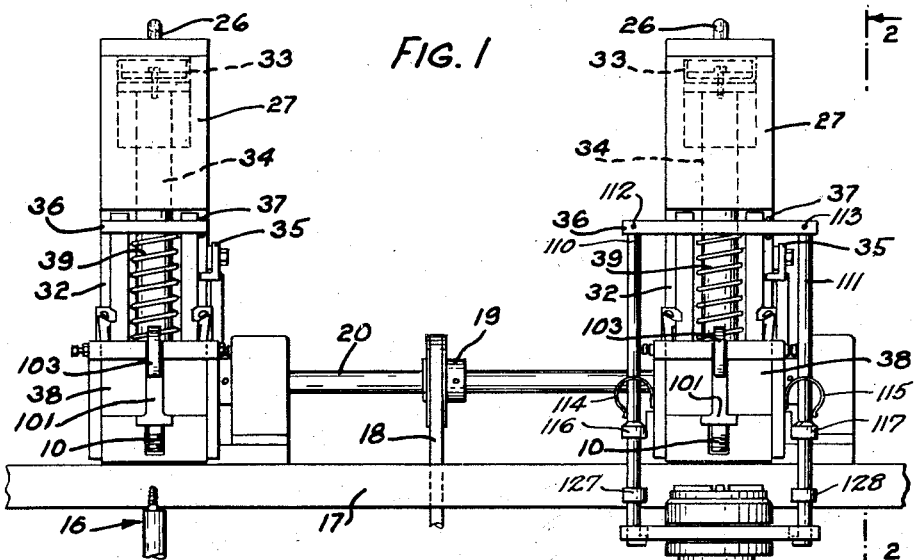
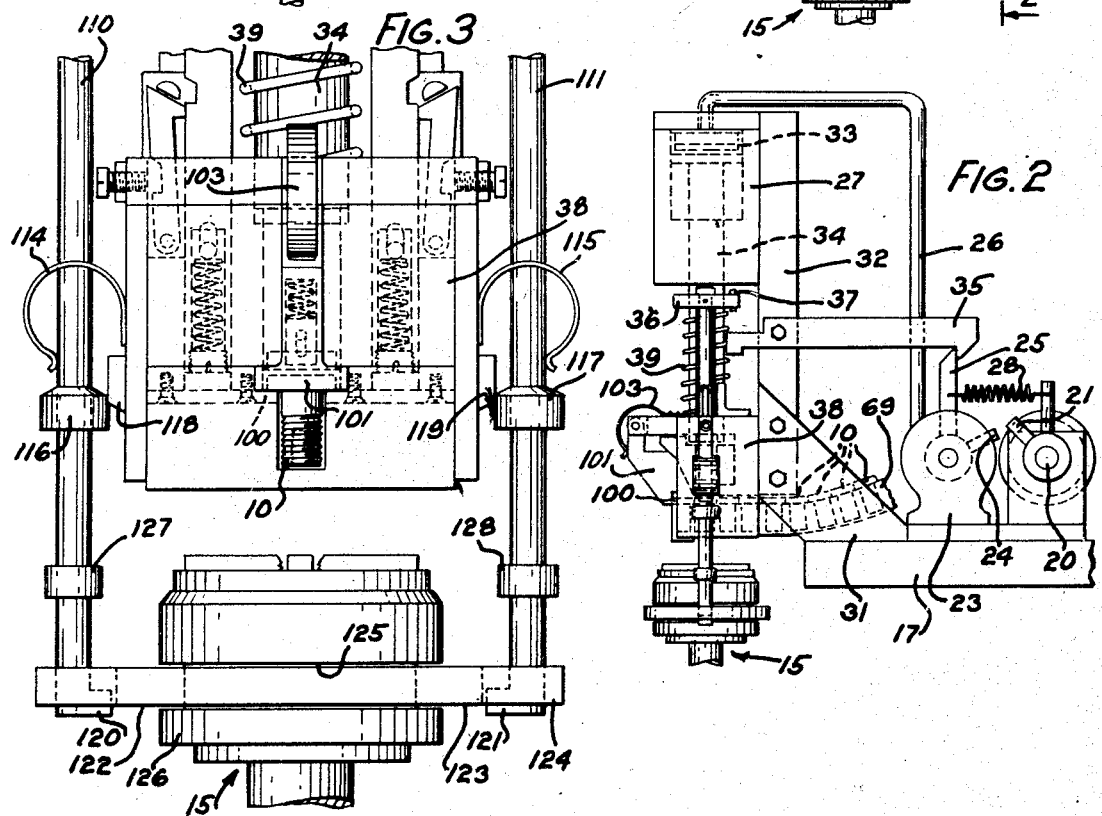
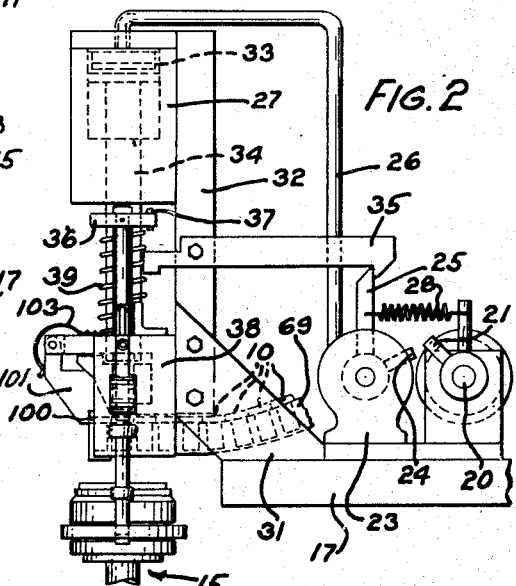
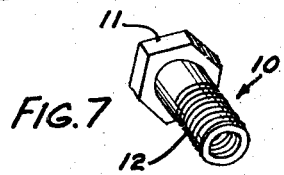
INVENTOR
B. A. RAETSCH
BY Emery Robinson
ATTORNEY

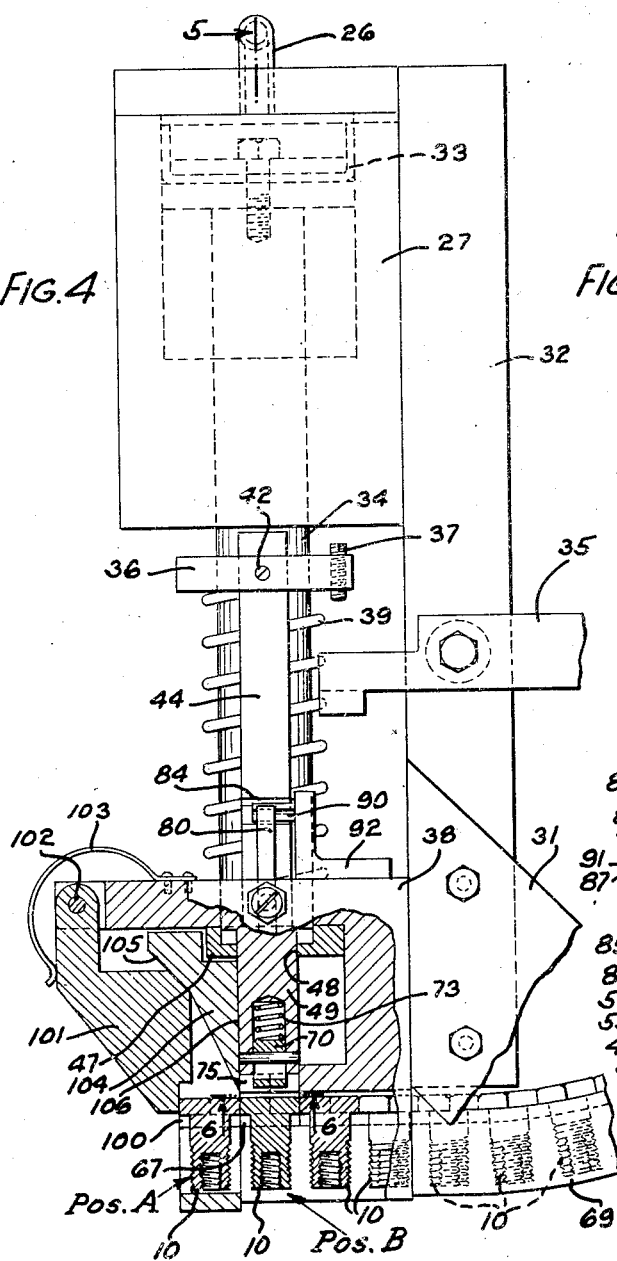

Patented Jan. 11, 1944

2,338,821

UNITED STATES PATENT OFFICE 2,338,821

THREADING APPARATUS

Bruno A. Raetsch, Baltimore, Md., assignor to Western Electric Company, Incorporated, New York, N. Y., a corporation of New York Application October 19, 1940, Serial No. 361,848

11 Claims. (Cl. 10—89)

This invention relates to threading apparatus and more particularly to apparatus for feeding and holding parts during the forming of internal and external threads thereon.

It is an object of the present invention to provide a simple mechanism for feeding and handling parts during the formation of threads thereon.

In accordance with one embodiment of the invention, as applied to a part having co-axial internal and external threads, a mechanism has been provided for rechasing the threads on the parts after the parts have been galvanized. This mechanism includes an internal threading station and an external threading station in each of which there is provided means for feeding parts through a threading position and automatically ejecting them on the side away from the side from which they are fed. The apparatus at the two stations are similar insofar as the feeding mechanism is concerned and the parts are fed from a magazine at each station wherein reciprocatable chuck mechanisms are provided which advance the parts to threading tools and eject a previously threaded part from the apparatus each time the chucking mechanism advances a new part to the threading tools. Means are also provided at the external threading station for opening the threading die after the part has been threaded a predetermined distance.

A better understanding of the invention will be had by reference to the following detailed description when considered in conjunction with the accompanying drawings, wherein Fig. 1 is a front elevational view of an apparatus for rechasing internal and external threads on an article;

Fig. 2 is a side elevational view taken along the line 2—2 of Fig. 1 in the direction of the arrows showing the mechanism for chasing the external thread;

Fig. 3 is an enlarged fragmentary front elevational view of the external threading station shown in Figs. 1 and 2;

Fig. 4 is an enlarged side elevational view, partly in section, of the apparatus at the internal threading station;

Fig. 5 is a sectional view taken along the line 5—5 of Fig. 4 in the direction of the arrows showing further details of the apparatus in the internal threading station;

Fig. 6 is a sectional view, on an enlarged scale, taken along the line 6—6 of Fig. 4 in the direction of the arrows showing a portion of the chucking means for holding the article during the threading thereof; and Fig. 7 is a view in perspective of the article being threaded.

In the drawings, wherein like reference characters designate the same parts throughout the several views, Fig. 1 shows, in front elevation, a preferred embodiment of the present invention, which is designed to rechase the internal and external threads on an article 10, most clearly shown in Fig. 7. The particular article 10, which this embodiment of the invention is designed to handle, has a hexagonal head 11 and a partially hollowed shank 12. The shank 12 of the article 10 has internal and external threads formed on it in any suitable threading apparatus and is then galvanized. In the galvanizing process, the threads are quite frequently clogged with the galvanizing material and it, therefore, becomes necessary to rechase and retap the external and internal threads on the shank of the article. The present invention is directed to an apparatus for performing these operations as expeditiously as possible, although it is obvious that the present apparatus might also be used for originally forming the internal and external threads before the part is galvanized.

In this embodiment of the invention, any suitable threading dies may be used; for example, the threading die shown in the patent to R. M. Strickland, No. 1,639,712, dated August 23, 1927, may be used to chase the external threads, and the threading die shown in the patent to H. Goldberg, No. 2,067,267, dated January 12, 1937, may be used to retap the internal threads. In the drawings, the external thread cutting mechanism has been designated generally by the numeral 15 and the internal thread cutting mechanism has been designated generally by the numeral 16. These mechanisms may be suitably mounted with respect to a table 17 on which the feeding mechanism is supported. Suitably mounted beneath the table 17 (Fig. 1) is a driving motor (not shown), which drives a belt 18 for controlling the actuation of the two feeding mechanisms. The belt 18 drives a pulley 19, which is fixed to a shaft 20. The shaft 20 (Fig. 2) carries a pair of valve actuating cams 21, only one of which is shown, since the cams 21 for controlling the operation of the feeding mechanism at both of the threading stations are identical. The construction and method of operation of these cams may be seen by reference to Fig. 2, wherein a reversible valve 23 is shown, which is provided with a control arm 24 and a latch arm 25. In the position shown in Fig. 2, the valve is in position to direct a fluid under pressure through a pipe 26 to a cylinder 27. The latch arm 25 is normally urged to rotate in a clockwise direction by a spring 28 to open the valve 23 and permit the fluid under pressure to be forced from the cylinder 27 back through the pipe 26.

Extending upwardly from the table 17 are suitable brackets 31, which support the lower end of the feeding mechanisms, which are, in turn, supported on a relatively thick plate 32 fixed to the brackets 31. Mounted on the upper end of the plate 32 is the cylinder 27, in which there is vertically reciprocatable a piston 33 having fixed to it a piston rod 34. Pivoted intermediate the ends of the plate 32 (Fig. 2) is a latch 35 for cooperation with the latch arm 25. The construction of the latch arm 25 and latch 35 is such that when the valve actuating cam 21 strikes the control arm 24, the latch arm 25, which is fixed to the control arm, will be moved to the position shown in Fig. 2, where the latch 35 will hold it until the latch 35 is rocked in a counter-clockwise direction about its pivot.

Fixed to the piston rod 34 is a rectangular plate 36 having a set screw 37 mounted in it for engaging the latch 35 and rocking it in a counter-clockwise direction after the piston 33 has moved downwardly a predetermined distance. Interposed between the plate 36 and a housing 38 and surrounding the piston rod 34 is a coil spring 39, which normally urges the piston upwardly, the housing 38 being fixed to the plate 32 adjacent the lower end of the plate 32. The mechanism described thus far is common to the feeding apparatus at both the internal and external threading stations and has, therefore, been shown in detail only in connection with the external threading station.

Referring to Figs. 4 and 5, wherein the specific details of construction of the feeding and holding mechanism at the internal threading station are shown, the plate 36 is fixed to the piston rod 34 by means of a pin 40 and has attached to it, by means of a pair of set screws 41 and 42, two guide rods 43 and 44, on the lower ends of which are, in turn, mounted a pair of guide blocks 45 and 46. The guide blocks 45 and 46 are interconnected by a yoke 47, which has an aperture 48 formed in it to receive a reduced portion 49 of the piston rod 34, and are supported on the guide rods 43 and 44 by means of pins 53 and 50. The pins 53 and 50 are fixed to the blocks 45 and 46 and extend into slots 51 and 52, respectively, in the rods 43 and 44. The lower ends of the rods 43 and 44 are hollowed out to receive springs 60 and 61, which are held in place by threaded blocks 62 and 63, and normally tend to force the pins 53 and 50 upwardly with respect to the rods 43 and 44 to hold the pins 53 and 50 against the upper ends of the slots 51 and 52. In the position shown in Figs. 4 and 5, the piston rod 34 has moved downward slightly due to the admission of fluid under pressure through the pipe 26 to the cylinder 27. However, the blocks 45 and 46 have not as yet started to move downwardly with the rods 43 and 44, since the springs 60 and 61 are still holding the blocks 45 and 46 and their associated yoke 47 up against the upper internal surface of the housing 38. The lower ends of the blocks 45 and 46 have stripper plates 67 and 68 fixed to them and these stripper plates are in the position shown in direct alignment with the end of a chute 69 so that articles 10 fed down the chute will move into position on the stripper plates 67 and 68.

Mounted in the lower end of the piston rod 34 is a spring pressed plunger 70, which has a limited movement in the end of the rod 34 due to the fact that the plunger has a slot 71 formed in it for receiving a pin 72, which permits movement of the plunger 70 with respect to the rod 34 under the pressure of a spring 73 seated in the hollowed-out portion of the lower end of the rod 34 and abutting the plunger 70. The extreme lower end of the rod 34 has a socket 75 formed therein, as most clearly shown in Fig. 6, for gripping four of the six sides of the head 11 of the article 10.

The blocks 45 and 46 are cut out to receive latches 79 and 80, which are pivoted on the blocks 45 and 46 at 81 and 82. These latches are designed to engage notches 83 and 84, respectively, formed in the guide rods 43 and 44 after the guide rods have moved downwardly with respect to the guide blocks 45 and 46. The latches 79 and 80 will be cammed into locking engagement with the notches 83 and 84 by adjustable camming pins 85 and 86, which cooperate with cam surfaces 87 and 88 formed on the latches. This camming action will take place when the rods 43 and 44 have moved downwardly with respect to the blocks 45 and 46 to the point where the latches are in registry with the notches 83 and 84, whereupon continued downward movement of the rods 43 and 44 will carry the blocks 45 and 46 with them to move the cam surfaces 87 and 88 into engagement with the camming pins 85 and 86. The blocks 45 and 46 and rods 43 and 44 will thus be locked together until the rods move upwardly on the return stroke of the piston 33 to bring camming surfaces 87 and 88 into engagement with camming pins 89 and 90, which are mounted on brackets 91 and 92 fixed to the housing 38. The lower end of the housing 38 (Fig. 4) has an extension 100 formed thereon, which constitutes an extension of the chute 69 and, as shown, is in direct alignment with the stripper plates 67 and 68 to hold an article 10, which has been threaded, in position "A" and thereby position a second article 10 in position B. The article in position "B" is directly under the socket 75 formed in the end of the piston rod 34. Cooperating with the extension 100 to hold the article 10 in place thereon is a pivoted member 101, which is pivoted on a pin 102 fixed to the housing 38. The pivoted member 101 is urged into engagement with the extension 100 by a spring 103 also fixed to the housing 38 and will hold the articles 10, which are fed by gravity down the chute 69, in the position shown in Fig. 4 until the piston 33 is moved downwardly to carry a tapered member 104 fixed to the blocks 45 and 46 downwardly. The tapered member 104 will engage the article 10 shown in position "A" as the tapered member 104 moves downwardly and will cam it to the left (Fig. 4). A camming surface 105 on the tapered member 104 will cam the pivoted member 101 to the left to disengage it from the article 10 shown in position "A," whereas the surface 106 of the tapered member 104 will hold the article 10 shown in position "B," in that position as the article is moved downwardly to the internal threading die 16 and will form a fifth side of the socket 75.

It will be understood that the feeding mechanisms at both the internal and external feeding stations are identical in construction, and while the specific details have been described in connection with the station for forming the internal thread in the article 10, the construction of the feeding mechanism in the portion of the apparatus which forms the external thread is exactly the same, the only difference being that the plate 36 provided at the external threading station is made somewhat longer than the plate at the internal threading station, as clearly shown in Fig. 1, and mechanism is provided for opening the threading die for forming the external threads at the external threading station. This mechanism comprises a pair of rods 110 and 111 pivotally mounted by means of pins 112 and 113 on the plate 36 and extending downwardly beside the housing 38. As most clearly shown in Fig. 3, the rods 110 and 111 are normally urged toward the housing 38 by springs 114 and 115. The rods 110 and 111 carry cam sleeves 116 and 117, which cooperate with stationary cams 118 and 119, respectively, mounted on the side of the housing 38. In the position shown in Fig. 3, the rods 110 and 111 have been moved outwardly by the stationary cams 118 and 119 to disengage extensions 120 and 121 from surfaces 122 and 123 of a yoke 124. The yoke 124 is mounted in an annular depression 125 of the external threading die 15 and upon movement upwardly closes the die to its operating position. Downward movement of the yoke 124 and consequent movement of a sleeve 126 of the external threading die, in which the annular groove 125 is formed, will cause the thread chasers in the die to move out of engagement with a part which has been threaded, all as described in the Strickland patent mentioned hereinbefore. This downward movement of the yoke 124 is caused by the engagement of collars 127 and 128 mounted on the rods 110 and 111 engaging the upper surface of the yoke 124 after the piston rod 34 has moved the part down sufficiently to put the desired number of threads on it.

In the operation of the apparatus, articles are fed from a suitable hopper (not shown) into the chutes 69 at each of the threading stations and ride down the chutes by gravity until one of the articles 10 abuts the pivoted member 101 in each threading station, whereupon the motor (not shown) may be started to drive the shaft 20. At the first revolution of the shaft 20, the valve actuating cam 21 in each threading station will strike the control arm 24 to move it to the position shown in Fig. 2, where it will be latched in place by the latch 25 in each threading station. The control arm 24 in the position shown will permit fluid under pressure to flow into the pipe 26 and cause the pistons 33 to move downwardly. As the pistons 33 start to move downwardly, carrying with them the piston rod 34, the spring 39 will be compressed and the rods 43 and 44 will move downwardly with respect to the blocks 45 and 46, the springs 60 and 61 expanding to hold the blocks 45 and 46 in the position shown in Figs. 4 and 5 until the ends of the rods 43 and 44 engage the stripper plates 67 and 68 and the enlarged portion of the piston 34 engages the upper surface of the yoke 47. In moving downwardly to the position where the enlarged portion of the piston 34 engages the yoke 47, the plunger 70 will first engage the head of the article 10 and then will be held by the article 10, compressing spring 13 while the socket formed in the end of the piston rod 34 surrounds the head of the article 10. Continued downward movement of the piston rod 34 will carry the blocks 45 and 46 with it and the article 10 will be locked between the stripper plates 67 and 68 and the socket 75 formed in the end of the piston rod 34.

The description of the operation thus far is exactly the same for both of the threading stations. However, the operation is slightly different for the two stations from this point onward and, therefore, the internal threading station will first be described.

As the article 10 is carried downwardly by the piston rod 34, it will move into engagement with the internal threading die 16 and since the die 16 is constantly rotating, the internal thread will be formed in the article 10 during the downward movement of the piston rod 34. As soon as the piston rod 34 reaches a position where the set screw 37 engages the left end (Fig. 4) of the latch 35, the latch 35 will release the latch arm 25 and permit the spring 28 to rock the latch arm 25 and control arm 24 in a clockwise direction to permit the fluid under pressure to be exhausted from the cylinder 27 by the action of the spring 39 in pushing the piston rod 34 upwardly. As soon as the piston rod 34 starts to return to its upward position, the direction of rotation of the internal threading die 16 will be reversed, as described in the patent to Goldberg noted hereinbefore, and the article 10 will be moved back to position in alignment with the end of the chute 69.

As the piston rod 34 moved downwardly, and in its downward movement picked up the blocks 45 and 46 to carry them downwardly, the tapered member 104 also moved downwardly and, in its downward travel, performed two functions. One of these functions was the camming of the pivoted member 101 to the left (Fig. 4) out of engagement with the article 10 in position "A." The other function of the tapered member 104 was the camming of the article 10 in position "A" out of that position to the left. As the piston 34 reaches its uppermost position and the socket in the end of the piston rod is drawn off the head of the article 10, the plunger 70 will force the article 10 out of the socket in the piston rod and as soon as the tapered member 104 clears the end of the article 10, which has had an internal thread formed in it, the weight of the other articles 10 in the chute 69 will move the article 10 at that time in position "B" over to position "A" and the next time that the piston rod 34 moves downwardly, the part which has just been threaded will be removed from the apparatus, as just described.

During the downward movement of the piston rod 34, the notches 83 and 84 formed in the rods 43 and 44 moved into registration with the latches 79 and 78, respectively, and as the blocks 45 and 46 started to move downwardly with the piston rod 34, the camming pins 85 and 86 cammed the latches 79 and 80 into the notches 83 and 84, whereby the blocks 45 and 46, with the stripper plates 67 and 68 on the bottom of them, served to lock the article 10 in the socket in the end of the piston rod 34 and hold this assembly together until the piston rod, in its upward movement, carried the camming surfaces 87 and 88 of the latches 79 and 80 into operative engagement with the pins 89 and 90 to unlatch the rods 43 and 44 from the blocks 45 and 46.

The operation of the apparatus in the external threading station is exactly the same insofar as the feeding of parts is concerned, but the control for the external threading die operates in addition to those operations described hereinbefore, and that occurs in the following manner. As the piston rod 34 moves downwardly, the rods 110 and 111 will move downwardly with it, and the cam sleeves 116 and 117 will ride off the surface of the stationary cams 118 and 119, whereupon the springs 114 and 115 will tend to move the lower ends of the rods 110 and 111 toward each other to carry the extensions 120 and 121 in under the surfaces 122 and 123 of the yoke 124. The rods 110 and 111 do not perform any function until the collars 127 and 128 engage the upper surface of the yoke 124, at which time the threading on the outside of the article 10 will be completed and continued downward movement of the piston rod 34 will cause the sleeve 126 to move downwardly to open the threading die 15 just prior to the time when the piston rod 34 starts to move up again. After the piston rod 34 moves upwardly a sufficient distance to clear the article 10 from the threading die 15, the extensions 120 and 121 will engage the surfaces 122 and 123 to move the sleeve 126 upwardly and close the threading die 15 in preparation for threading a succeeding article 10.

Although a specific embodiment of the invention has been described hereinbefore, it will be understood that some modifications thereof may be made without departing from the invention, which is to be limited only by the appended claims.

What is claimed is:

1. In a threading apparatus, a rotatable threading die, an article holding means comprising a stripper plate and a piston rod having a socket in it, guiding means initially movable with respect to said piston and then movable with said piston rod to carry an article into association with the threading die, and means fixed to the guiding means for ejecting a previously threaded part.

2. In a threading apparatus, a rotatable threading die, an article holding means comprising a stripper plate and a piston rod having a socket in it, guiding means initially movable with respect to said piston and then movable with said piston rod to carry an article into association with the threading die, and means fixed to the guiding means for ejecting a previously threaded part, said ejecting means including an abutment cooperating with the plunger for restraining movement of an article being threaded.

3. In a threading apparatus, a rotatable threading die, a chute for conducting parts toward a position in alignment with said threading die, a movable stripper means forming a continuation of said chute in one of its positions, means for supporting said stripper means, a member initially movable with respect to said supporting means and stripper means, means for locking said member and supporting and stripping means together upon movement of the member in one direction, and means for unlocking said locked together parts on movement of the member in the opposite direction.

4. In a threading apparatus, a reciprocatable piston, means for normally urging the piston into a predetermined position, means for driving the piston in the opposite direction, means connected to said piston for engaging an article to be threaded to hold said article against rotation, clamping means associated with said last mentioned means for holding an article during bodily movement thereof, and means for latching said clamping means to the holding means comprising a pair of latches, a pair of actuator rods for the clamping means, and camming means for camming the latches into latching engagement with the rods.

5. In a threading apparatus, a chute for feeding articles to position to be threaded, a support for articles in said position, a threading die in vertical alignment with articles held in said position, means for holding the articles and moving them vertically into operative engagement with the threading means, a stop member for normally restraining movement of articles through said chute, and means on the article holding and moving means for rendering the stop member inoperative.

6. In a threading apparatus, a chute for feeding articles to position to be threaded, a support for articles in said position, a threading die in vertical alignment with articles held in said position, means for holding the articles and moving them vertically into operative engagement with the threading means, a stop member for normally restraining movement of articles through said chute, and means on the article holding and moving means for rendering the stop member inoperative, said last mentioned means also being effective to eject a threaded part in cooperation with the holding means.

7. In a threading apparatus, a fluid actuated piston, a spring for normally holding said piston in a predetermined position, a piston rod attached to said piston, a cross plate secured to said piston rod, a pair of actuator rods attached to said cross plate, clamping means mounted on said actuator rods for cooperating with the piston rod to hold parts during the threading thereof, ejecting means mounted on said clamping means for ejecting parts after they have been threaded, a pair of rods pivoted on said cross plate and normally urged toward each other, extensions formed on said rods for cooperation with a die controlling yoke to close said die, and sleeves mounted on said rods for cooperation with the die controlling yoke to effect opening of said die upon a predetermined amount of movement of said cross plate.

8. In a threading apparatus, means for feeding articles in one plane, a rotatable threading die, means for feeding articles at an angle to the plane of feed of the aforementioned feeding means and into and out of operative association with said threading die, and means on said second feeding means independent of the articles being worked on for positively ejecting a threaded article at right angles to said second feeding means.

9. In a metal working apparatus, means for supporting an article to be worked on, means for working on said article, means for causing said article supporting member to move the article into and out of operative engagement with said article working means, and means independent of the articles being worked on associated with said article supporting means for positively ejecting an article therefrom.

10. In a threading apparatus, a fluid actuated piston, a spring for normally holding said piston in a predetermined position, a piston rod attached to said piston, a cross plate secured to said piston rod, a pair of actuator rods attached to said cross plate, clamping means mounted on said actuator rods for cooperating with the piston rod to hold parts during the threading thereof, a pair of rods pivoted on said cross plate and normally urged toward each other, extensions formed on said rods for cooperating with a die controlling yoke to close said die, and sleeves mounted on said rods for cooperation with the die controlling yoke to effect opening of said die upon a predetermined amount of movement of said cross plate.

11. In a threading apparatus, a threading member, a chute for headed articles having edges forming a slot, the heads of articles to be threaded being slidable on said edges when the bodies of said articles hang through said slot, a reciprocable member having edges normally in alignment with the edges of said slot for receiving an article, means for moving down over the head of an article in said member and then moving said member and said article toward said threading member and into engagement therewith, and means independent of the articles being worked on for ejecting a threaded article from said reciprocable member.

BRUNO A. RAETSCH.